United States Patent [19]

Doi et al.

[11] Patent Number: 5,066,754
[45] Date of Patent: Nov. 19, 1991

[54] NARROW MOLECULAR WEIGHT DISTRIBUTION HYDROCARBON SOLUBLE HOMOPOLYMER OF 1,4-PENTADIENE

[75] Inventors: Yoshiharu Doi, Kanagawa; Satoshi Ueki; Hiroyuki Furuhashi, both of Saitama, all of Japan

[73] Assignee: Tonen Corporation, Tokyo, Japan

[21] Appl. No.: 493,254

[22] Filed: Mar. 14, 1990

[30] Foreign Application Priority Data

Mar. 28, 1989 [JP] Japan .................................. 1-73986

[51] Int. Cl.$^5$ ............................................. C08F 136/20
[52] U.S. Cl. .................................. 526/336; 526/169.2; 526/335
[58] Field of Search ....................... 526/336, 335, 169.2

[56] References Cited

U.S. PATENT DOCUMENTS 3,880,819  4/1975  Natta et al. .................... 526/336 X

FOREIGN PATENT DOCUMENTS 0311299  4/1989  European Pat. Off. ............ 526/336

OTHER PUBLICATIONS

*Jour. of Poly. Sci.*, Part A-1, vol. 6, pp. 1605, 1607, 1609, 1611, 1613, (1968).
*Ziegler–Natta Catalysts and Polymerization*, Academic Press, p. 549 (1979).

*Primary Examiner*—Fred Teskin
*Attorney, Agent, or Firm*—Myron B. Kurtzman

[57] ABSTRACT

Polymers of 1,4-pentadiene having an Mw/Mn of 1.05 to 1.4 are produced by polymerizing 1,4-pentadiene in the presence of catalyst comprising a vanadium chelate compound and an organoaluminum compound.

1 Claim, 1 Drawing Sheet

NARROW MOLECULAR WEIGHT DISTRIBUTION HYDROCARBON SOLUBLE HOMOPOLYMER OF 1,4-PENTADIENE

BACKGROUND OF THE INVENTION

1. Field of industrial application

The present invention relates to a process for producing 1,4-pentadiene polymers and the polymers therefrom.

2. Prior Art

It is known that 1,4-pentadiene can be polymerized by the aid of a catalyst composed of titanium trichloride and triethyl aluminum, or a catalyst composed of titanium tetrachloride and triethyl aluminum or diethyl aluminum chloride. (See Journal of Polymer Science, Part A-1, vol. 6, p. 1605, [1959].) The thus obtained polymer is said to be amorphous and contain 27–64% of heptane solubles.

On the other hand, an attempt has been made to polymerize 1,5-hexadiene by the aid of a catalyst composed of V(acetylacetonato)$_3$ and AlEt$_2$Cl. (See "Ziegler-Natta Catalysts and Polymerization", Academic Press, p. 549 [1979].)

PROBLEMS TO BE SOLVED BY THE INVENTION

It is an object of the present invention to provide a polymer of 1,4-pentadiene which has a narrow molecular weight distribution and is completely soluble in hydrocarbons.

MEANS TO SOLVE THE PROBLEMS

The present inventors found that the object of the present invention is achieved by polymerizing 1,4-pentadiene at a low temperature, preferably below $-50°$ C., in the presence of a catalyst composed of a vanadium chelate compound and an organoaluminum compound, said catalyst being known to be effective for the homogeneous polymerization of propylene or ethylene. The present invention was completed on the basis of this finding.

SUMMARY OF THE INVENTION

The gist of the present invention resides in a process for producing a 1,4-pentadiene polymer which comprises polymerizing 1,4-pentadiene in the presence of a catalyst composed of a vanadium compound represented by the general formula given below and an organoaluminum compound.

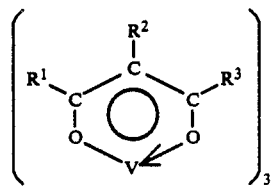

wherein $R^1$, $R^2$, and $R^3$ each denotes a hydrogen atom or a $C_{1-8}$ hydrocarbon group, provided that at least one of $R^1$, $R^2$, and $R^3$ should be a hydrogen atom but all of $R^1$, $R^2$, and $R^3$ should not be hydrogen atoms.

CATALYST

(a) Vanadium compound

The process of the present invention employs a vanadium compound represented by the general formula given below.

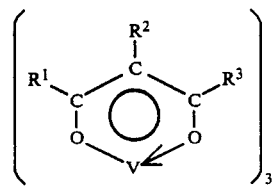

wherein $R^1$, $R^2$, and $R^3$ are defined as above. The vanadium compound represented by the general formula above will be explained with reference to the following examples.

Those in which $R^2$ is a hydrogen atom and $R^1$ and $R^3$ are hydrocarbon groups.

$R^1/R^3$: $CH_3/CH_3$, $CH_3/C_2H_5$, $C_2H_5/C_2H_5$, $CH_3/C_6H_5$, $C_2H_5/C_6H_5$, $C_6H_5/C_6H_5$, $CH_3/C_6H_5CH_2$, $C_6H_5CH_2/C_6H_5CH_2$, $C_2H_5/C_6H_5CH_2$, and $C_6H_5/C_6H_5CH_2$.

Those in which $R^2$ is a hydrocarbon group and either of $R^1$ and $R^3$ is a hydrogen atom, with the other being a hydrocarbon group.

$R^2/R^1$ or $R^3$: $CH_3/CH_3$, $C_2H_5/CH_3$, $CH_3/C_2H_5$, $C_2H_5/C_2H_5$, $C_6H_5/CH_3$, $CH_3/C_6H_5$, $C_6H_5/C_2H_5$, $C_2H_5/C_6H_5$, $C_6H_5/C_6H_5$, $C_6H_5CH_2/CH_3$, $CH_3/C_6H_5CH_2$, $C_6H_5CH_2/C_6H_5CH_2$, $C_6H_5CH_2/C_2H_5$, $C_2H_5/C_6H_5CH_2$, $C_6H_5CH_2/C_6H_5$, and $C_6H_5/C_6H_5CH_2$.

Those in which $R^2$ is a hydrogen atom and either of $R^1$ and $R^3$ is a hydrogen atom, with the other being a hydrocarbon group.

$R^1$ or $R^3$: $CH_3$, $C_2H_5$, $C_6H_5$, and $C_6H_5CH_2$.

Preferable among the above-listed compounds are the following.

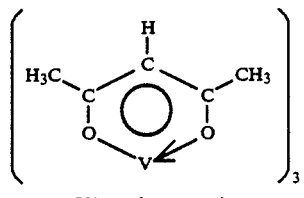

V(acetylacetonato)$_3$

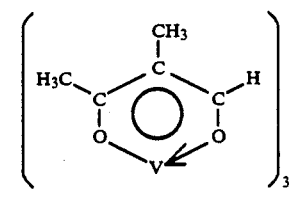

V(2-methyl-1,3-butanedionato)$_3$

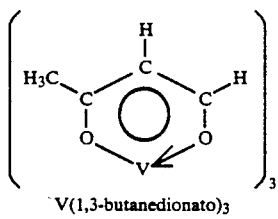

V(1,3-butanedionato)₃

(b) Organoaluminum compound

The organoaluminum compound is one which is represented by the general formula $R_nAlX_{3-n}$ (where R denotes an alkyl group or aryl group; X denotes a halogen atom or hydrogen atom; and n is an arbitrary number defined by $1 \leq n < 3$.) It is a compound, mixture, or complex compound of $C_{1-18}$ (preferably $C_{2-6}$) alkyl aluminum, such as dialkyl aluminum monohalide, monoalkyl aluminum dihalide, and alkyl aluminum sesquihalide. Dialkyl aluminum monohalide includes dimethyl aluminum chloride, diethyl aluminum chloride, diethyl aluminum bromide, diethyl aluminum iodide, diisobutyl aluminum chloride; monoalkyl aluminum dihalide includes methyl aluminum dichloride, ethyl aluminum dichloride, methyl aluminum dibromide, ethyl aluminum dibromide, ethyl aluminum diiodide, and isobutyl aluminum dichloride; and alkyl aluminum sesquihalide includes ethyl aluminum sesquichloride.

The organoaluminum compound should be used in an amount of 1 to 1,000 mol for 1 mol of the vanadium compound.

POLYMERIZATION OF 1,4-pentadiene

Figure 1:
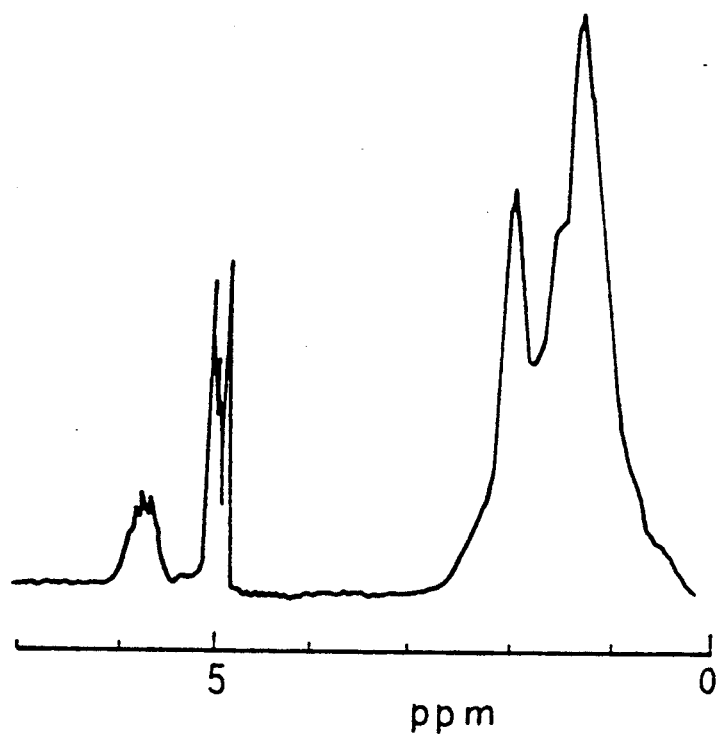
FIG. 1 is an NMR chart of the polymer obtained according to the process of the present invention.

The polymerization of 1,4-pentadiene should preferably be carried out in a solvent which remains inert and liquid during the polymerization. Examples of such a solvent include propane, butane, pentane, hexane, heptane, and toluene. The polymerization temperature is not specifically limited; but it should be lower than normal temperature, preferably lower than −50° C. so that the resulting polymer has as narrow a molecular weight distribution as possible. Especially, polymerization at temperatures below −65° C. gives rise to a nearly monodisperse polymer having a molecular weight distribution of 1.05 to 1.4 (the ratio of Mw (weight-average molecular weight) to Mn (number-average molecular weight). The yield and molecular weight of the polymer will be proportional to the length of polymerization time.

The thus obtained polymer has a molecular weight (Mw) of 2,000–500,000 in terms of propylene. In addition, it is soluble in aliphatic and aromatic hydrocarbons and ethers and insoluble in alcohols and ketones. It has a carbon-carbon double bond in the side chain.

EFFECT OF THE INVENTION

The process of the present invention gives rise to a polymer which is completely soluble in hydrocarbons and has a very narrow molecular weight distribution especially when polymerization is performed at a low temperature. It permits the production of such a polymer at 100% selectivity.

The polymer has a double bond in the side chain and is soluble in hydrocarbons as mentioned above. Moreover, it permits easy chemical modification of its terminals by the living polymerization which proceeds at −50° C. or below. Owing to these properties, it will find use as a raw material of adhesives, paints, blending compatibilizers, surfactants, and viscosity index improvers for lubricating oil.

EXAMPLE 1

In a 300-ml flask, with the atmosphere therein thoroughly replaced with nitrogen, was placed 30 ml of toluene, followed by cooling to −78° C. To the flask was added 50 mmol of 1,4-pentadiene at the same temperature. To the flask were further added a toluene solution containing 20 mmol of $Al(C_2H_5)_2Cl$ and a toluene solution containing 1 mmol of $V(acetylacetonato)_3$. Polymerization was initiated with stirring. After polymerization for 4 hours at −78° C., the reaction mixture was brought into contact with 300 ml of HCl-ethanol mixture. The resulting polymer was washed five times with 300 ml of ethanol, followed by drying under reduced pressure at normal temperature.

The resulting polymer was tested for molecular weight by GPC. It was found that Mn=3,400 (in terms of propylene) and Mw/Mn=1.4. In addition, this polymer gave a 100 MHz $^1$H-NMR spectrum as shown in FIG. 1.

The spectrum has peaks at 4.5–6.0 ppm assigned to the terminal double bond. By comparing the area of these peaks with that of the peaks at 1.0–2.5 ppm assigned to methylene and methylenic hydrogen, it was found that the polymer is poly(1,4-pentadiene) in which the monomer unit contains 40% of double bond.

The resulting polymer is soluble in n-heptane, benzene, and tetrahydrofuran, and is insoluble in methanol, ethanol, acetone, and methyl ethyl ketone.

EXAMPLE 2

The polymerization of 1,4-pentadiene was carried out in the same manner as in Example 1, except that the polymerization time was changed to 9 hours. The results are shown in Table 1.

EXAMPLE 3

In a 300-ml flask, with the atmosphere therein thoroughly replaced with nitrogen, was placed 120 ml of toluene, followed by cooling to −50° C. To the flask was added 125 mmol of 1,4-pentadiene at the same temperature. To the flask were further added a toluene solution containing 10 mmol of $Al(C_2H_5)_2Cl$ and a toluene solution containing 1 mmol of $V(2-methyl-1,3-butanedionato)_3$. Polymerization was initiated with stirring. After polymerization for 4 hours at −50° C., the polymer of 1,4-pentadiene was treated in the same manner as in Example 1. The results are shown in Table 1.

EXAMPLE 4

The polymerization of 1,4-pentadiene was carried out in the same manner as in Example 3, except that the polymerization time was changed to 8 hours. The results are shown in Table 1.

EXAMPLE 5

The polymerization of 1,4-pentadiene was carried out in the same manner as in Example 1, except that the $V(acetylacetonato)_3$ was replaced by $V(1,3-butanedionato)_3$, the amount of toluene was changed to 120 ml and the amount of 1,4-pentadiene was changed to 125 mmol. The results are shown in Table 1.

EXAMPLE 6

The polymerization of 1,4-pentadiene was carried out in the same manner as in Example 3, except that the polymerization temperature was changed to −20° C. The results are shown in Table 1.

TABLE 1

| Example No. | Yields (g/g-V atom) | $\overline{M}n$ (× 10³) | $\overline{M}w/\overline{M}n$ |
|---|---|---|---|
| 1 | 9.6 | 3.4 | 1.4 |
| 2 | 14.5 | 4.9 | 1.3 |
| 3 | 30.6 | 4.9 | 1.4 |
| 4 | 61.0 | 10.1 | 1.4 |
| 5 | 12.6 | 3.8 | 1.4 |
| 6 | 53.2 | 3.5 | 2.4 |

We claim:
1. Hydrocarbon soluble homopolymer of 1,4-pentadiene having a $\overline{M}n$ in range of about 2,000 to 500,000 and a $\overline{M}w/\overline{M}n$ of 1.05 to 1.4, having side chain unsaturation.

* * * * *